United States Patent Office 3,080,343
Patented Mar. 5, 1963

3,080,343
DIAMINE-UREA-THIOUREA COPOLYMER
George E. Ham, Kansas City, Mo., assignor, by mesne assignments, to Monsanto Chemical Company, a corporation of Delaware
No Drawing. Filed Jan. 28, 1959, Ser. No. 789,506
5 Claims. (Cl. 260—77.5)

This invention relates to new synthetic polymeric materials and to a process for producing same. More particularly, the invention is concerned with the manufacture of new copolymers formed from an organic diamine, urea, and thiourea. Further, the invention relates particularly to those copolymers which are capable of being formed into new synthetic fibers, filaments, and the like of improved properties.

Polythioureas are known polymeric materials which have proved somewhat useful in the synthetic fiber- and filament-forming art. One method proposed heretofore for the manufacture of polythioureas comprises heating substantially in stoichiometric proportions a mixture of one or more diamines and a thiourea-forming derivative of thiocarbonic acid, such as carbon disulfide; the resulting polythioureas can be formed into textile filaments by conventional processes. Another process for making condensation products proposes reacting an anhydride of a thiocarbonic acid, for example, carbon disulfide, with an aliphatic diamine, the amino groups of which are separated by a hydrocarbon chain of at least three carbon atoms and thereafter heating the product until a highly polymeric substance is obtained which is capable of being drawn out into filaments or like articles. Still another known method for the production of fiber-forming polythioureas comprises reacting carbon disulfide with an aliphatic diamine, the amino groups of which are separated by a hydrocarbon chain containing at least three carbon atoms, to form an intermediate salt, and heating this salt until a fiber-forming thermoplastic polythiourea is obtained, wherein the carbon disulfide is reacted with the diamine in the form of an aqueous emulsion.

In all of the prior art processes outlined above in their preferred embodiments carbon disulfide is employed as one of the monomeric components in the condensation reactions. Certain disadvantages are attendant with such method. In the first place carbon disulfide is a highly volatile, inflammable, and toxic substance and is dangerous to handle. Moreover, the use of carbon disulfide is hazardous to workers, and extreme care must be taken. As a consequence, the installation of additional and expensive equipment, such as venting devices, fire-protection equipment, and the like are necessary. Furthermore, when employing carbon disulfide in the manufacture of polythiourea a thiocarbamate may be formed as an intermediate product. If it is desired to produce a polythiourea from which satisfactory fibers and filaments can be produced, it is necessary to purify the intermediate thiocarbamate. Obviously, this increases the cost of the final product, as well as complicating the process, thereby making such prior art processes economically disadvantageous.

It is a primary object of the present invention to produce new and improved polymeric materials. It is another object of the invention to provide a new process for producing the new and improved polymeric materials. It is still another object of the invention to prepare new and improved polymeric materials that are useful in the manufacture of fibers, filaments, films, coating compositions, lacquers, and the like. It is yet another object to provide a composition of matter from which said new polymeric materials may be formed. Other objects and advantages of the instant invention will appear and will be apparent from the description thereof hereinafter.

In accordance with one preferred procedure of the present invention the new polymeric material is produced by forming a mixture of the calculated amounts of ingredients comprising: (a) an organic diamine, (b) thiourea, and (c) urea, and heating the resulting mixture at an elevated temperature with evolution of ammonia until a viscous, molten, highly polymeric mass is obtained. It is preferred to continue the reaction until the polymeric mass has a molecular weight within the range that textile filaments can be formed therefrom. The reaction normally is carried out at atmospheric pressure, although the reaction may be carried out at pressures below atmospheric pressure. In general, the process employed to prepare the new copolymers is a condensation reaction that is easily controlled and requires no special equipment. However, in order to obtain a light colored material, it is necessary to conduct the reaction in substantial absence of oxygen. That is to say, the reaction should be carried out in an inert atmosphere, for example, in the presence of nitrogen, argon, helium, and the like.

A variety of organic diamines may be employed in the practice of the invention. It has been found that saturated aliphatic primary and secondary diamines in which the reactive amino groups are separated by a linear chain of at least four, as well as basic aromatic primary and secondary diamines in which the shortest carbon chain connecting the reactive amino groups includes at least three carbon atoms of one ring, are suitable monomeric substances. It will be appreciated that primary-secondary amines of the just-defined classes of organic diamines also may be used. Among such organic diamines are tetramethylene diamine, pentamethylene diamine, hexamethylene diamine, heptamethylene diamine, octamethylene diamine, m-phenylenediamine, p-phenylenediamine, benzidine, etc.

The proportions of the quantities of organic diamine, thiourea, and urea employed in the reaction mixture may vary without departing from the invention. In general, the diamine is advantageously used in a molar amount substantially equal to the sum of the molar amounts of the other two reactants. Depending upon the specific organic diamine employed and the type of polymeric product desired, the mol percent ratio of combined diamine based on the final product may range from about 30 to 60. On the other hand, the mol percent ratio of combined urea based on the final product may range from about 20 to 60; and the mol percent ratio of combined thiourea based on the final product may range from about 5 to 30.

The copolymers are conveniently prepared by mass polymerization although they may be prepared in a liquid medium that is inert to the reaction. A suitable catalyst or a combination of two or more catalysts may be used if desired to increase the rapidity of the reaction.

In carrying out the reaction of the present invention, the reaction temperature may be varied in the order of 100° C. to 300° C. and higher. For better results, it is preferred to operate in the range of 200° C. to 300° C. As indicated above, the heating is done generally under an inert atmosphere since at these elevated temperatures the condensing mixture is susceptible to oxidation by air or even traces of oxygen. Oxidation causes darkening and degradation of the polymer; and accordingly, it is important to exclude oxygen from the reaction vessel when any color in the final product will be detrimental, such as in the preparation of fiber-forming polymers. Obviously where color is not a factor, nitrogen or other inert gas need not be employed. The exclusion of oxygen may be accomplished in one manner by sweeping the air out of the reaction vessel with the inert gas prior to the initiation of the reaction and maintaining the oxygen-free atmosphere by passing a continuous stream of the inert gas through the reaction vessel during polycondensation. The stream of inert gas will assist also in the removal of undesirable volatile by-products, such as ammonia, which may be produced. It is understood that in producing the polyurea-thiourea copolymer of the present invention the polymerization may be conducted in the presence of molecular weight regulators that act as chain terminators and prevent the formation of large molecular weight increments. Other additives that modify the polymer such as delusterants, plasticizers, pigments, colorants, oxidation inhibitors, and the like may be incorporated in the polymer if desired.

While the invention includes the production of relatively low molecular weight polymers that may be useful in the manufacture of coating compositions, lacquers, and the like, it is primarily concerned with polymers that have film- and filament-forming properties. When the reaction is continued until a molecular weight of at least 5,000 is attained, filaments made from the polymers usually exhibit cold-drawing properties with consequent increase in filament strength. For best results the polycondensation is carried to the extent that the resultant polymer has a molecular weight of at least 15,000, the molecular weight being determined by measuring the viscosity of dilute polymer solutions in a manner well-known in the art.

Upon completion of the polymerization process, the polymers formed may be drawn into filaments immediately or they may be cooled and ground to any convenient size for storage. The molten polymer may be cooled by quenching in water and the resultant product ground to the desired size and dried.

The copolymers of this invention are capable of being spun into continuous filaments, from which staple fibers can be made, if desired. The spinning may be carried out in a number of ways. For example, the polymers may be dissolved in a suitable solvent therefor and the resultant solution extruded through a spinneret into a coagulating bath. Thereafter the coagulated filaments are washed, if desired or necessary, and continuously collected on a suitably revolving drum or spindle, or the like. Instead of using a coagulating bath, the extruded solution may be passed through a heated chamber where the solvent is removed by evaporation. In view of the properties of the copolymers produced in accordance with the instant new process, it is possible to spin the molten polymers directly without the addition of any solvent or plasticizer. A mass of the molten polymer may be touched with a rod and upon drawing the rod away, a filament is formed. The filament may then be caught on a revolving drum or reel. In this manner a continuous filament may be drawn from the molten mass until the latter is exhausted. The cross-section of the filaments thus obtained can be regulated by controlling the temperature of the molten mass and the rate of reeling. The higher the temperature and the more rapid the rate of reeling, the finer will be the filament.

Continuous filaments may also be produced by extruding the molten polymer through a spinneret and continuously collecting the extruded filament on a rotating drum. The fineness of the filaments may be controlled by properly correlating the temperature of the molten polymer, the amount of pressure applied during spinning, the size of the orifice in the spinneret and the rate of reeling.

Filaments produced from the copolymers of this invention have the ability to accept a very high degree of permanent orientation under stress. By the application of moderate stress at ordinary temperatures these filaments can be instantly elongated or cold-drawn. The filaments can be cold-drawn as much as several times their original lengths. These cold-drawing operations may be carried out on filaments, which have been allowed to cool fully and solidify, or the cold-drawing may follow the formation of the filaments directly as one part of a continuous process.

In the cold-drawing operation any suitable apparatus and process may be used. For example, the filaments may be wound from one roller to another with the second roller rotating at a higher speed than the first roller. For example, the second roller may be rotated at a speed up to about four or five times that of the first roller. If desired, cold-drawing may be effected by employing a snubbing pin. This process of cold-drawing differs from the stretch-spinning known to the artificial fiber art in that it may be carried out very rapidly and completely in the total absence of any solvent or plasticizer.

The term "cold-drawing," as employed herein, includes, in addition to drawing filaments at temperatures as low as 0° C., warming the filaments to facilitate stretching, for example, by passing the filaments through warm or hot water or steam before and/or during the cold-drawing operation, or drawing the filaments at any temperature below the melting point thereof.

For a more detailed description of the present invention, reference is made to the following specific examples which are merely intended to be illustrative and not limitative. In the examples all parts and percentages are by weight unless otherwise indicated.

*Example I*

A mixture of 4.0 parts of commercial hexamethylene diamine (72%), 0.654 part of thiourea, and 1.55 parts of urea was placed in a reaction vessel and heated for one hour at 222° C. with nitrogen introduction. Thereafter the temperature was raised to 290° C. for one hour. A viscous polymer melt was obtained which was light amber in color and having a melt viscosity of approximately 250 poises at 290° C. Filaments were formed by touching the melt with a glass rod and withdrawing same therefrom. The polymer melt solidified on cooling and had a melting point of 254° C.

*Example II*

A mixture of 4.0 parts of commercial hexamethylene diamine (72%) and 1.31 parts of thiourea and 1.04 parts of urea was placed in a reaction vessel and heated for three hours at 222° C. with nitrogen being maintained and introduced in the vessel. A light yellow solution was obtained which increased in viscosity to 154 poises with the evolution of ammonia. The resulting polymer had a sticking point of 150° C. and melted at 206° C.

*Example III*

A mixture of 4.0 parts of commercial hexamethylene diamine (72%), 0.66 part of thiourea, and 2.08 parts of urea was heated at 222° C. After two hours a polymer of high viscosity was obtained and possessed a sticking point of 200° C. and a melting point of 230° C.

When the above procedures are repeated with other defined organic diamines and in the amounts set forth hereinabove, similar excellent results are obtained. For example, when tetramethylene diamine, m-phenylenediamine, etc., are employed instead of hexamethylene diamine, useful polymers are likewise obtained.

As many variations within the spirit and scope of this invention will occur to those skilled in the art, it is to be understood that the invention is not limited to the specific embodiments thereof except as set forth in the appended claims.

What is claimed is:

1. A method of producing a fiber-forming copolymer comprising forming a mixture of ingredients comprising (a) an organic diamine selected from the group consisting of saturated aliphatic primary and secondary diamines in which the reactive amino groups are separated by a linear chain of at least 4 atoms and basic phenyl aromatic primary and secondary diamines in which the shortest carbon chain connecting the reactive amino groups includes at least three carbon atoms of one ring; (b) thiourea; and (c) urea; said diamine being present in a mol percent of about 30 to 50 based on the final product, said thiourea being present in a mol percent of 5 to 30 based on the final product, and said urea being present in a mol percent of 20 to 60 based on the final product the total of the three components being 100 mol percent, and heating the resulting mixture at an elevated temperature until a viscous molten mass is obtained from which cold-drawable fibers may be formed.

2. A method of producing a fiber-forming copolymer comprising forming a mixture of ingredients comprising (a) hexamethylene diamine; (b) thiourea; and (c) urea; said diamine being present in the mol percent of 30 to 50 based on the final product, said thiourea being present in the mol percent of 5 to 30 based on the final product, and said urea being present in the mol percent of 20 to 60 based on the final product the total of the three components being 100 mol percent, and heating the resulting mixture at an elevated temperature in the range of 100° C.–300° C. until a viscous molten mass is obtained from which cold-drawable fibers may be formed.

3. The process of claim 1 wherein the temperature is between 100° C. and 300° C.

4. A fused copolymer from which cold-drawable fibers may be formed comprising the reaction product of heating together at an elevated temperature the mixture of (a) an organic diamine selected from the group consisting of saturated aliphatic primary and secondary diamines in which the reactive amino groups are separated by a linear chain of at least four atoms and basic phenyl aromatic primary and secondary diamine in which the shortest carbon chain connecting the reactive amino groups include at least three carbon atoms of one ring; (b) thiourea; (c) urea; said diamine, said thiourea and said urea being present in said mixture in a mol percent of about 30–50, 5–30 and 20–60, respectively the total of the three components being 100 mol percent, based on the final product.

5. A fiber-forming copolymer from which cold-drawable fibers may be formed, comprising the reaction product of heating together at a temperature in the range of 100° C.–300° C., the mixture of (a) hexamethylene diamine; (b) thiourea, and (c) urea, said diamine, said thiourea and said urea being present in said mixture in a mol percent of about 30–50, 5–30 and 20–60, respectively the total of the three components being 100 mol percent, based on the final product.

References Cited in the file of this patent

UNITED STATES PATENTS

| | | |
|---|---|---|
| 1,890,033 | Gams et al. | Dec. 6, 1932 |
| 2,595,400 | Maynard | May 6, 1952 |
| 2,828,291 | Saunders | Mar. 25, 1958 |
| 2,957,845 | Wesp | Oct. 25, 1960 |

FOREIGN PATENTS

| | | |
|---|---|---|
| 530,267 | Great Britain | Dec. 9, 1940 |

OTHER REFERENCES

Lowy et al.: "Introduction to Organic Chemistry," 6th ed. (1945), page 213.